US010559098B1

(12) United States Patent
Belkin et al.

(10) Patent No.: US 10,559,098 B1
(45) Date of Patent: Feb. 11, 2020

(54) COLOR SAMPLING FOR DISPLAYING CONTENT ITEMS

(71) Applicant: Facebook, Inc., Menlo Park, CA (US)

(72) Inventors: Michael Oren Belkin, San Francisco, CA (US); Christopher Joseph Welch, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/299,958

(22) Filed: Mar. 12, 2019

Related U.S. Application Data

(63) Continuation of application No. 15/787,537, filed on Oct. 18, 2017, now Pat. No. 10,269,145.

(51) Int. Cl.
*G06T 7/00* (2017.01)
*G06T 11/00* (2006.01)
*G06T 7/90* (2017.01)

(52) U.S. Cl.
CPC .............. *G06T 11/001* (2013.01); *G06T 7/90* (2017.01); *G06T 2207/10024* (2013.01); *G06T 2207/20072* (2013.01); *G06T 2207/30176* (2013.01)

(58) Field of Classification Search
None
See application file for complete search history.

(56) References Cited

U.S. PATENT DOCUMENTS

| | | | | |
|---|---|---|---|---|
| 6,870,544 B2* | 3/2005 | Blanchard | ........... | G06F 3/04845 345/589 |
| 7,280,118 B2* | 10/2007 | Senn | ....... | G01J 3/462 345/594 |
| 8,373,720 B2* | 2/2013 | Voliter | ........... | H04N 1/622 345/589 |
| 2007/0257933 A1* | 11/2007 | Klassen | ......... | G06T 11/001 345/593 |
| 2008/0062192 A1* | 3/2008 | Voliter | ........ | G06F 3/04845 345/591 |
| 2010/0020095 A1* | 1/2010 | Reynolds | ........ | G06Q 30/02 345/594 |
| 2011/0018896 A1* | 1/2011 | Buzyn | ........... | G06F 3/0481 345/594 |

(Continued)

OTHER PUBLICATIONS

United States Office Action, U.S. Appl. No. 15/787,537, dated Aug. 27, 2018, 6 pages.

Primary Examiner — Martin Mushambo
(74) Attorney, Agent, or Firm — Fenwick & West LLP

(57) ABSTRACT

An online system is configured to provide content items to users. The content item includes an image, and is displayed with a color block or colored border as an accent to the image. The color of the color block or colored bordered is dynamically selected based upon the image included in the content item, and is selected using a waterfall selection method comprising a sequence of different selection methods, each selection method configured to select a color based upon a most common color of the image that satisfies a respective set of selection criteria or determine that no color meets the respective set of selection criteria. The selection methods may comprise a dominant color selection method wherein the selected color corresponds to a most dominant color of the image, and a complementary color selection method wherein the select color is a complement of a dominant color of the image.

20 Claims, 7 Drawing Sheets
(3 of 7 Drawing Sheet(s) Filed in Color)

(56) References Cited

U.S. PATENT DOCUMENTS

| | | | |
|---|---|---|---|
| 2011/0216966 A1* | 9/2011 | Cok | G06T 11/001 |
| | | | 382/162 |
| 2013/0207994 A1* | 8/2013 | Rodeski | G06F 16/957 |
| | | | 345/594 |
| 2015/0379743 A1* | 12/2015 | Dorner | H04N 1/644 |
| | | | 345/593 |
| 2017/0206677 A1* | 7/2017 | Dziuba | G06T 11/001 |
| 2017/0337017 A1* | 11/2017 | Watanabe | G03G 15/5025 |

* cited by examiner

| Strategy | Selection Method | Colorfulness Threshold | Allow Brorange | Min % |
|---|---|---|---|---|
| 1 | Dominant | High | No | 3.0% |
| 2 | Dominant | High | No | 0.5% |
| 3 | Dominant | Medium | No | 1.0% |
| 4 | Dominant | Medium | No | 0.5% |
| 5 | Complementary | N/A | No | 0.5% |
| 6 | Dominant | Low | Yes | 0.75% |
| 7 | Complementary | N/A | Yes | 0.25% |

FIG. 7

COLOR SAMPLING FOR DISPLAYING CONTENT ITEMS

CROSS REFERENCE TO RELATED APPLICATIONS

This application is a continuation of co-pending U.S. application Ser. No. 15/787,537, filed Oct. 18, 2017, which is incorporated by reference in its entirety.

BACKGROUND

This disclosure relates in general to displaying content items to users on an online platform, and in particular, to display formats of content items.

Users of an online system, such as a social network site, are often presented with a large number of different types of content. For example, the user of a social network site may view a newsfeed containing posts or status updates by other users, various types of content shared by other users (e.g., images, video, links, and/or the like), sponsored content, etc.

Certain types of content may be displayed to the user as an image, which the user can click on to access the content. Different types of formatting may be used when displaying content items, allowing the user to more easily differentiate between certain types of content items, or to draw the user's eyes to certain types of content items. For example, certain types of items may be displayed with an accent color that borders or surrounds the image associated with the content item. It is desirable to be able to select an accent color that complements or contrasts the image associated with the content item, in order to give the displayed content item a more eye-catching look and feel.

SUMMARY

To improve the appearance of content items displayed to users, an online system may display a content item with an accent color. For example, the content item may include an image to be displayed, and the accent color may correspond to a color block, which is an area/portion or block of color or colored border adjacent to or surrounding the image. The color is dynamically selected such that it complements or contrasts with the image associated with the content item, in order to give the displayed content item a more unified look and feel.

In some embodiments, the online system receives a content item to be provided to a user of the online system, the content item including an image. The online system may determine that the content item is to be displayed with a color block, colored border, or other visual element, as an accent to the image. In some embodiments, the online system dynamically selects a color to use in displaying the color block using an algorithm that corresponds to a waterfall selection method by executing a sequence of selection methods. For example, the online system may execute a first selection method to determine a color to use in displaying the color block, or to determine that no color satisfies the first selection method, wherein the color is selected based upon a most common color of the image that satisfies a first set of selection criteria. In response to a determination that no color satisfies the first selection method, the online system executes one or more additional selection methods to determine a color to use in displaying the color block, wherein the color determined using each of the one or more additional selection methods is based upon a most common color of the image that satisfies a respective set of selection criteria. The online system provides the content item for display to the user of the online system, wherein the displayed content item includes at least the image associated with the content item and the color block, colored border, or other visual element as an accent to the displayed image, using the selected color determined in the waterfall selection method. In some embodiments, the accent color is displayed with text associated with the displayed image.

The sequence of selection methods may comprise at least one dominant color selection method and/or at least one complementary color selection method. A dominant color selection method determines a first color corresponding to a most common color of the image that satisfies a respective set of selection criteria, or that no color of the image satisfies the one or more selection criteria. A complementary selection method is configured to identify a first color that is a complement of a second color that is present in the image, based upon a respective set of selection criteria, or that no color satisfies the respective set of selection criteria. The selection criteria may comprise a prominence threshold indicating a minimum amount of the image associated with the selection color, a contrast threshold indicating a contrast between the selected color and a predetermined color, a colorfulness threshold for the selected color, and/or one or more hue restrictions on the selected color.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 7 illustrates a plurality of example selection methods that may be used in a waterfall approach, in accordance with some embodiments.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overall System Environment

Figure 1:
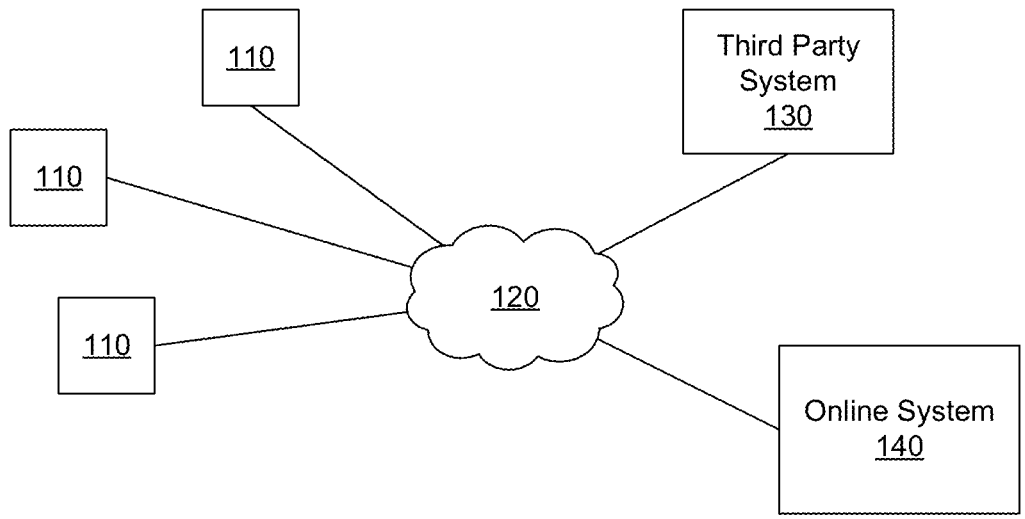
FIG. 1 is a block diagram of a system environment for an online system, in accordance with some embodiments.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. For example, the online system 140 may be a social networking system, a content sharing network, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Figure 2:
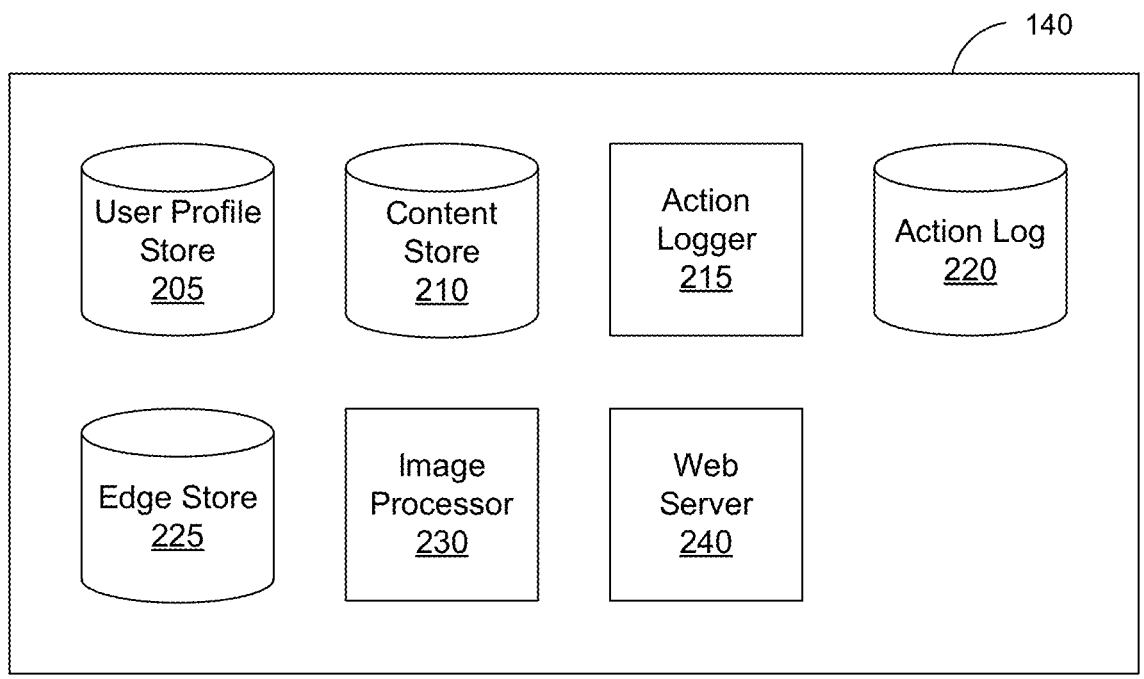
FIG. 2 is a block diagram of an architecture of the online system, in accordance with some embodiments.

FIG. 2 is a block diagram of an architecture of the online system 140. The online system 140 shown in FIG. 2 includes a user profile store 205, a content store 210, an action logger 215, an action log 220, an edge store 225, an image processor 230, and a web server 240. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 may be associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140. Each user or object can be represented as a node in the social network and the nodes are connected to each other via edges. In one embodiment, the nodes and edges form a complex social network of connections indicating how users and/or objects are related or connected to each other (e.g., one user accepted a friend request from another user to become connections in the social network) and how a user is connected to an object due to the user interacting with the object in some manner (e.g., "liking" a page object, joining an event object or a group object, etc.). Objects can also be connected to each other based on the objects being related or having some interaction between them.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The image processor 230 is configured to format and display content items (e.g., content stored in the content store 210) to a user of the online system 140. For example, as the user 140 views various webpages on the online system 140, the user may be presented with different types of content items. These may include posts or status updates by other users of the online system, content shared by other users (e.g., images, video, links to other online systems or webpages), sponsored advertisement content, and/or the like. For example, the content items may be displayed to the user as part of a social network newsfeed. In some embodiments, content items displayed to the user may be selected based upon one or more affinities associated with the user.

In some embodiments, certain types of content items are associated with an image (e.g., a preview image). In order to increase a visibility of the content item or to visually differentiate the content item from other types of content items, the image processor 230 may format how the content item is displayed, such as by adding an accent color to be displayed in conjunction with the image associated with the content item (e.g., bordering or surrounding the image of the content item). In some embodiments, in order to give the displayed content item a more unified look and feel, the image processor 230 selects the accent color based upon the image associated with the content item.

The web server 240 links the online system 140 via the network 120 to the one or more client devices 110, as well as to the one or more third party systems 130. The web server 240 serves web pages, as well as other content, such as JAVA®, FLASH®, XML and so forth. The web server 240 may receive and route messages between the online system 140 and the client device 110, for example, instant messages, queued messages (e.g., email), text messages, short message service (SMS) messages, or messages sent using any other suitable messaging technique. A user may send a request to the web server 240 to upload information (e.g., images or videos) that are stored in the content store 210. Additionally, the web server 240 may provide application programming interface (API) functionality to send data directly to native client device operating systems, such as IOS®, ANDROID™, or BlackberryOS.

Content Items with Accent Colors

Figure 3A:
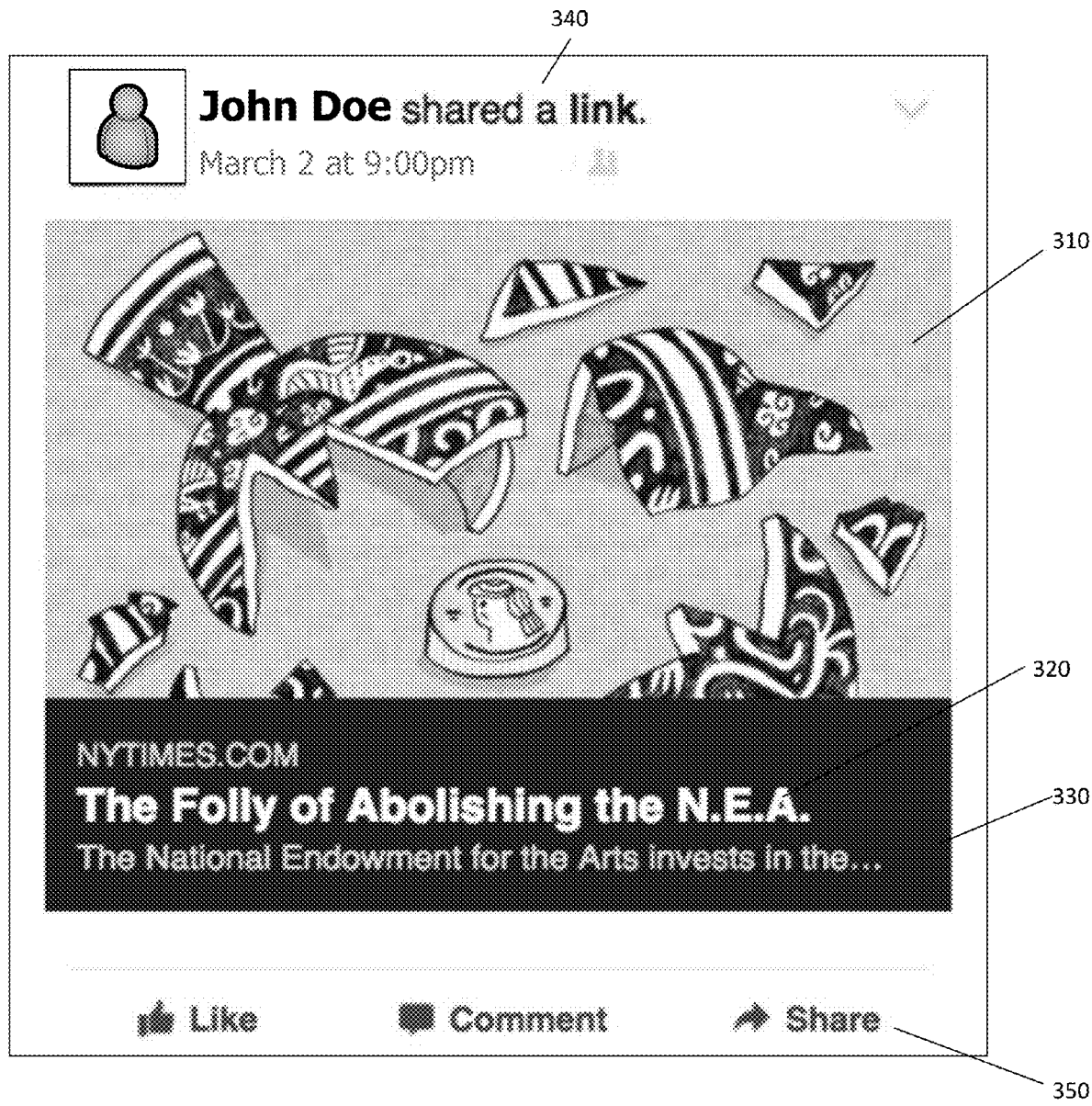
FIG. 3A illustrates an example of a content item that may be displayed to a user of an online system.

FIG. 3A illustrates an example of a content item 300 that may be displayed to a user of an online system. In some embodiments, the content item 300 may be integrated as part of a newsfeed displayed to the user of the online system. For example, where the online system corresponds to a social networking platform, the content item 300 may correspond to a content item shared or posted by another user, an advertisement displayed to the user, and/or the like. The content item 300 may comprise an image, video, file, link to another online system or website, and/or the like. The content item 300 may be stored in the content store 210 illustrated in FIG. 2.

In some embodiments, the content item 300 is displayed to the user using a preview image 310. The preview image 310 may be any image associated with the content item 300. For example, if the content item 300 is an image, the preview image 310 may correspond to the image or a manipulated version of the image (e.g., a down-sized version of the image). If the content item 300 is a file, the preview image 310 may correspond to an image of an icon representative of the file, or may correspond to an image stored within the file. If the content item 300 corresponds to a video, the preview image 310 may correspond to a screenshot of the video. If the content item 300 is a link to another online system or website, the preview image 310 may be an image associated with the other online system or website pointed to by the link (e.g., an image displayed on the website). In some embodiments, the user may be able to interact with the content item 300 through the preview image 310 (e.g., clicking on the preview image 310 to open the file, play the video, or access the other online system or website corresponding to the content item 300).

The content item 300 may also be associated with text 320. The text 320 may correspond to a name or title for the content item (e.g., a file or image name, a title for a video, a title of another online system or website that the content item 300 links to, and/or the like). In some embodiments, the text 320 comprises multiple pieces of text associated with the content item 300. For example, in FIG. 3A where the content item 300 is a link to an article on a website, the text 320 comprises a domain name of the linked website, a title of the article to which the link points, and a subtitle of the article.

In some embodiments, certain content items may be displayed with an accent color in order to differentiate the content item from other types of content displayed to the user. For example, in some embodiments, content items 300 corresponding to links are displayed with an accent color to make the content items 300 visually distinct from other content items corresponding to text or files, draw the user's eyes to the content items 300, or to indicate to the user that the content items 300 may be interacted with. In some embodiments, such as that illustrated in FIG. 3A, the accent color may comprise a color box 340 of a uniform color surrounding the text 320. In other embodiments (not shown), the accent color may comprise a colored border around the image 310 and/or the text 320. It is understood that in other embodiments, accent colors may be displayed in other ways in relation to content items 300.

In some embodiments, the content item 300 may further be associated with an identifier 340 indicating a source associated with the content item (e.g., an identity of another user who shared the content item 300). The content item 300 may also be associated with one or more user interface elements 350 (e.g., buttons or icons) that allow the user to perform actions relating to the content item 300 (e.g., "like" the content item 300, comment on the content item 300, share the content item 300 with other users, etc.). In some embodiments, the identifier 340 or the user interface elements 350 may be omitted when displaying the content item 300.

Figure 3B:
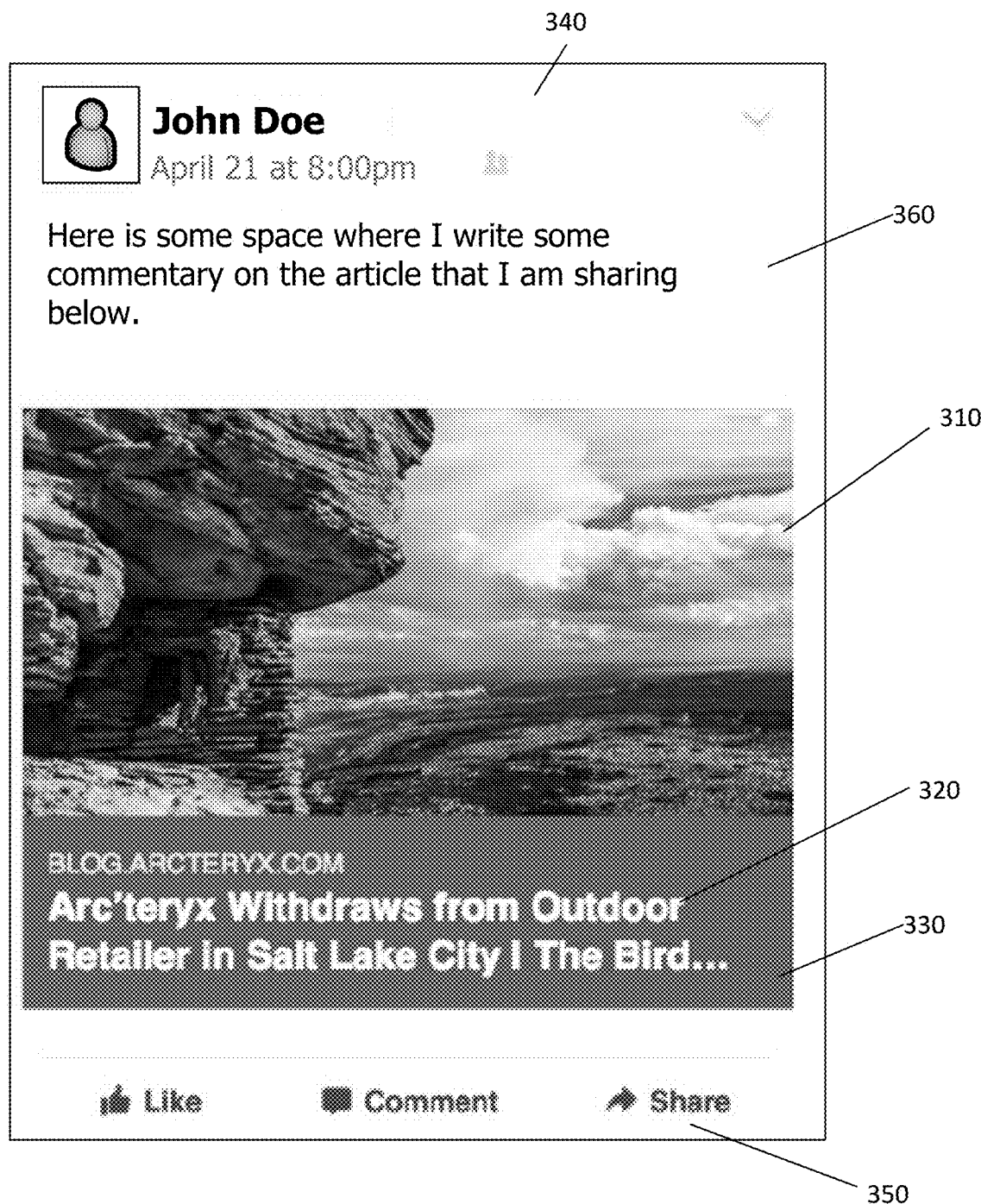
FIG. 3B illustrates another example of a content item that may be displayed to a user of an online system.

FIG. 3B illustrates another example of a content item 300. In some embodiments, the content item 300 may be associated with additional text or annotations 360. For example, the additional text 360 may correspond to comments from another user who shared the content item 300 (e.g., as identified by the identifier 340) relating to the content item 300.

Accent Colors Selection

In some embodiments, the accent color associated with the content item 300 is dynamically selected by the image processor 230, based upon the colors present in the preview image 310. This allows for the accent color and the preview image 310 to have a visually consistent feel, improving the appearance of the content item 300 to the user.

The accent color may also be selected based on a set of selection criteria, which may be defined by an administrator of the online system. In some embodiments, where the accent color is displayed in a color box 330 surrounding the text 320, the accent color must be a color having sufficient contrast with the color of the text 320, such that the text 320 in the color box 330 will be readable to the user. For example, where the text 320 comprises white text, the accent color is selected to have sufficient contrast with white, such that white text will be readable in the color box 330. In some embodiments, certain colors may be excluded from being selected as accent colors. For example, an administrator of the online system may decide that brown and orange are not desirable for use as accent colors, even if they meet other selection criteria, as the use of those colors may be considered not visually appealing to users of the online system.

In some embodiments, the accent color may be selected using a histogram or other data structure (hereinafter collectively referred to as "histogram") indicating different colors present in the preview image 310. The image processor 230 analyzes the preview image 310 to determine which colors appear most frequently in the preview image 310, and constructs the histogram indicating the colors present in the preview image 310 and a respective percentage of the preview image 310 corresponding to each different color. The respective percentages indicated in the histogram should add up to 100. In some embodiments, the histogram indicates a number of pixels in the preview image 310 corresponding to each color. As used herein, the percentage or number of pixels of the preview image 310 covered by a particular color may be referred to as the "coverage" of the color. In some embodiments, the image processor 230 may organize colors into color ranges (e.g., different colors that are similar in hue by a threshold amount may be considered part of the same color range), and the histogram for the preview image 310 may indicate coverage amounts of each of a plurality of color ranges. Each color range may be associated with a particular color representative of the color range. In some embodiments, the image processor 230 quantizes the preview image 310, potentially reducing a number of different colors present in the preview image 310, and generates the histogram based upon the colors of the quantized preview image 310. In some embodiments, the accent color is selected based on a dominant color of the preview image 310, while in other embodiments, the accent color is selected based on a complementary color of the preview image 310. Each of these will be described in greater detail below.

Dominant Color Selection

In some embodiments, the image processor 230 selects the accent color for a content item 300 based upon a dominant color of the preview image 310 associated with the content item 300. By using as the accent color based upon a dominant color of the preview image 310, the displayed accent color (e.g., the color box 330) may appear integrated with the preview image 310, giving the content item 300 a more unified look and feel.

To select a dominant color for use as an accent color, the image processor 230 analyzes the preview image 310 to determine which colors appear most frequently in the preview image 310. In some embodiments, as discussed above, the image processor 230 constructs a histogram corresponding to the preview image 310. The image processor 230 is able to determine, based on the generated histogram, a most common color of the preview image 310 (e.g., a color of the preview image 310 having the most coverage). When selecting an accent color using dominant color selection, the image processor 230 selects a color with greatest coverage in the preview image 310 that satisfies one or more selection criteria.

Figure 4:
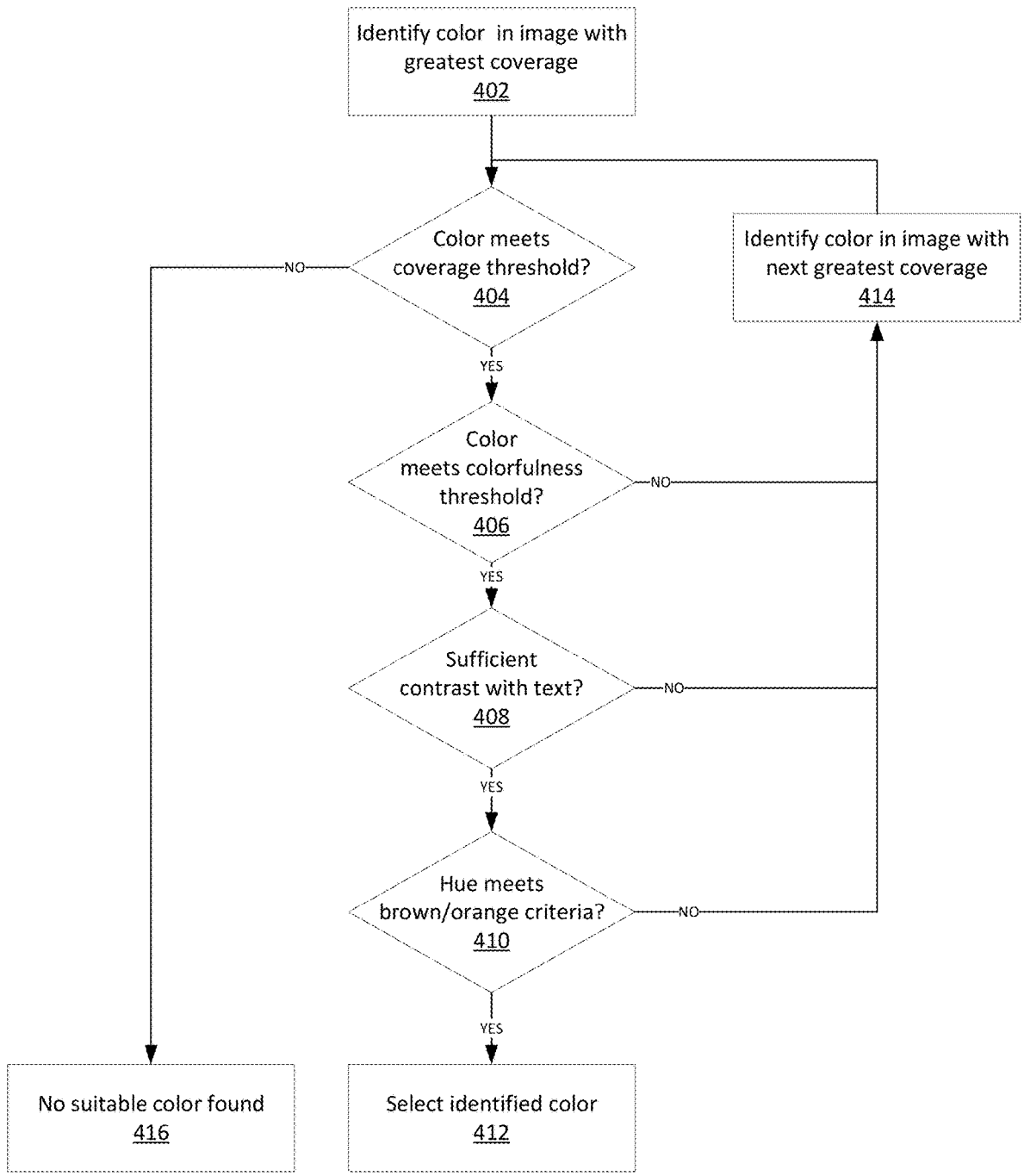
FIG. 4 illustrates a flowchart of an example process for selecting an accent color using a dominant color selection method, in accordance with some embodiments.

FIG. 4 illustrates a flowchart of an example process for selecting an accent color using a dominant color selection method, in accordance with some embodiments. At block 402, the image processor 230 selects a color in the preview image 310 with the greatest coverage. In some embodiments, the image processor 230 generates a histogram or other data structure indicating coverage levels for each color within the preview image 310, and identifies a color having the greatest coverage in the preview image 310.

At block 404, the image processor 230 determines if the identified color meets a coverage threshold. In some embodiments, the accent color is required to have at least a minimum amount of coverage in the preview image 310. As such, the image processor 230 only considers colors or color ranges of the preview image 310 that exceed a coverage threshold when selecting an accent color. If the identified color does not meet the coverage threshold, then the process proceeds to block 416, where it is determined that no suitable accent color has been found.

On the other hand, if the selected color meets the coverage threshold, then at blocks 406, 408, and 410, the image processor 230 checks the identified color against a plurality of different selection criteria. For example, at block 406, the image processor 230 checks if the identified color meets a colorfulness threshold. In some embodiments, the identified color may be required to meet a colorfulness threshold in order to be used as an accent color. As used herein, colorfulness may correspond to an attribute of a color, indicating a degree to which the color appears more or less chromatic to a user. The higher the colorfulness of a particular color, the more chromatic the color appears. The colorfulness of a color may be based upon a chromatic component of the color, a saturation of the color, and/or the like. In some embodiments, the colorfulness of a color may be based at least in part upon human perception (e.g., human eyes are more sensitive to certain colors, and may perceive certain colors as being more "colorful" than others, even if the different colors have the same or similar overall mathematical colorfulness). For example, a red color may be perceived to be more colorful than a blue color, which in turn may be perceived to be more colorful than a brown color, even if all three colors are similarly bright.

In some embodiments, the image processor 230 may also check if the identified color does not exceed a second colorfulness threshold. In some embodiments, it may be desirable to limit the colorfulness of accent colors, in order to avoid using colors that are too bright or too "loud." Limiting the accent color to those having a colorfulness beneath the second colorfulness threshold may allow for accent colors that are more muted to be selected.

At block 408, the image processor 230 checks if the identified color has sufficient contrast with the color of the text 320 to be displayed with the preview image 310. For example, if the text 320 comprises white text, the identified color must have sufficient contrast with the color white to be easily readable by a user of the online system.

At block 410, the image processor 230 checks if the identified color meets certain hue criteria. For example, in some embodiments, color corresponding to certain hues (e.g., brown or orange hues) may be disallowed for use as accent colors. In some embodiments, the hue criteria may be considered as part of the colorfulness determination (e.g., brown and orange hues may be considered to be less colorful compared to other colors such as blue), or may be considered separately.

If the identified color meets all the selection criteria specified at blocks 406, 408, and 410, then at block 412, the image processor 230 selects the identified color as an accent color to be displayed with the content item 300 (e.g., as a color box 330, a border, and/or the like).

On the other hand, if the identified color does not satisfy at least one of the selection criteria, then at block 414, the image processor 230 identifies a color in the image having the next greatest coverage. The process may then return to block 404, where the image processor 230 determines if the identified color meets the minimum coverage threshold.

As such, the image processor 230 will select the color of the preview image 310 having the greatest coverage while satisfying all of the one or more selection criteria. If none of the colors of the preview image 310 above a certain coverage threshold satisfy the selection criteria, then the image processor 230 may be unable to select a suitable accent color for the content item 300. In some embodiments, if no suitable color is selected, the image processor 300 may select a default color to use as an accent color, or may attempt to use a different method for selecting an accent color for the content item 300 (e.g., a method having less restrictive selection criteria).

In some embodiments, the image processor 230 may apply a transformation on the selected suitable accent color. For example, the image processor 230 may alter attribute of the selected accent color (e.g., darken the selected accent color slightly) in order to prevent the accent color displayed with the preview image 310 from blending into the image.

For example, as illustrated in FIG. 3A, the image processor 230 may select the dark blue color of the preview image 310 to use as the accent color for the color box 330. While the dark blue color is not the color in the preview image 310 having the greatest coverage (e.g., having less coverage than the light green background of the preview image 310), it is the color in the preview image 310 having the greatest coverage while satisfying all selection criteria (e.g., whereas the light green background color is not selected as the accent color, due to having insufficient contrast with white text).

It is understood that although FIG. 4 illustrates certain types of selection criteria, in other embodiments, different combinations of selection criteria may be used. For example, in embodiments where the accent color is used for a border around the content item 300 instead of a color box 330 on which the text 320 is overlaid, it may be unnecessary for the accent color to have a sufficient level of contrast to the color of the text 320. It is also understood that to the extent FIG. 4 illustrates checking identified colors against the selection criteria in a certain order, any order of selection criteria may be used.

Complementary Color Selection

In some embodiments, the image processor 230 may select a color as an accent color for the content item 300 based upon a complement of a color of the preview image 310. For example, as illustrated in FIG. 3B, the image processor 230 may select a blue or teal color for use as the accent color for the color box 330, which corresponds to a complement of the dominant orange color of the preview image 310. In some embodiments, using a complementary color as an accent color may provide for a contrast between the color box 330 and the preview image 310, drawing the user's eye to the displayed content item 300 until also maintaining a unified look and feel for the displayed content item 300.

Figure 5:
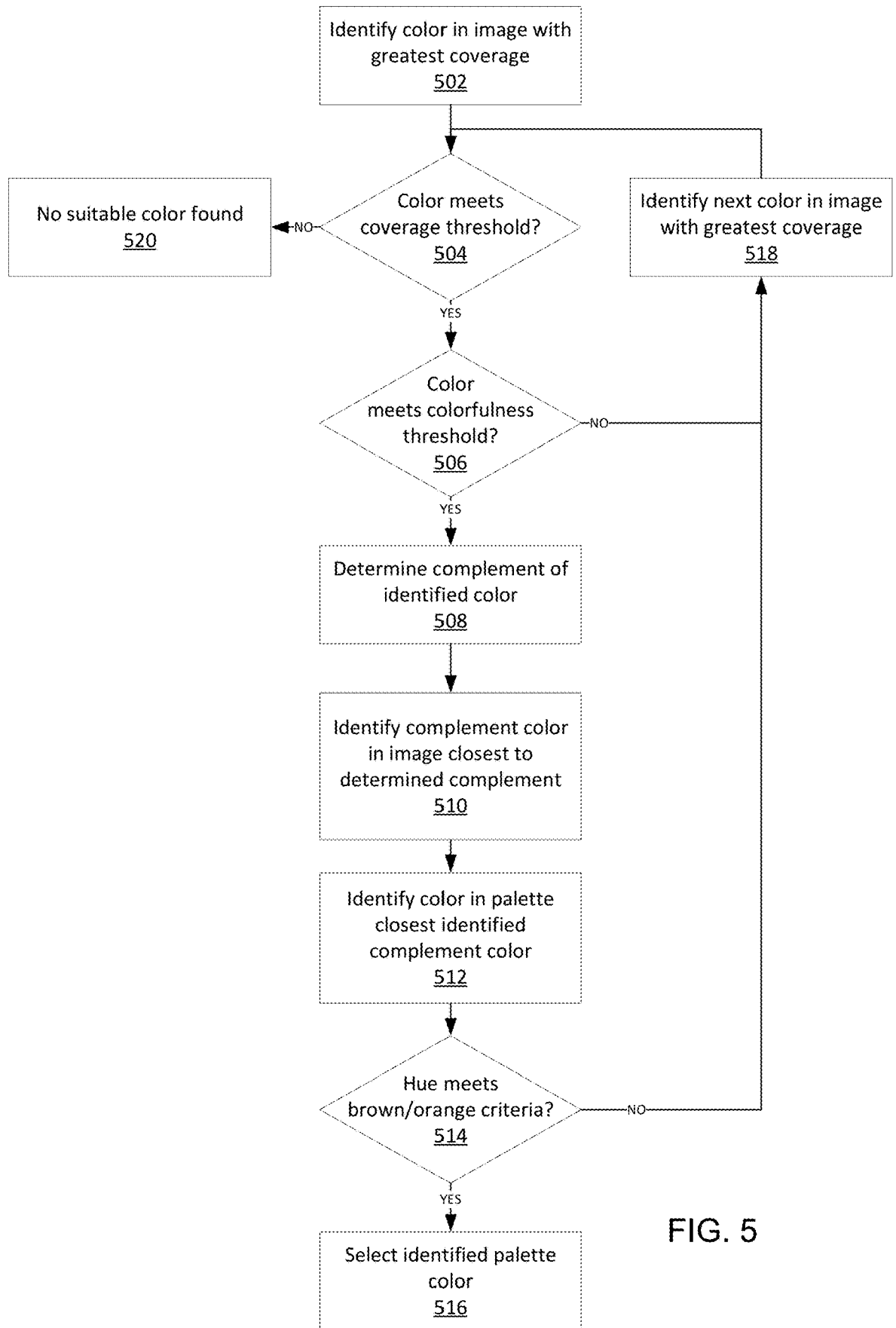
FIG. 5 illustrates a flowchart of an example process for selecting an accent color using a complementary color selection method, in accordance with some embodiments.

FIG. 5 illustrates a flowchart of an example process for selecting an accent color using a complementary color selection method, in accordance with some embodiments. At block 502, the image processor 230 identifies a color of the preview image 310 having the greatest coverage. In some embodiments, the image processor 230 generates a histogram or other data structure indicating coverage levels for each color or color range within the preview image 310, and selects a color or color range having the greatest coverage in the preview image 310.

At block 504, the image processor 230 determines if the identified color meets a coverage threshold. If the identified color does not meet the coverage threshold, then the process proceeds to block 520, where it is determined that no suitable accent color has been found.

At block 506, the image processor 230 optionally determines if the identified color meets a colorfulness threshold. In some embodiments, the identified color of the preview image 310 may be required to meet a threshold level of colorfulness if the accent color is to be based upon a complement of the identifier color. This may help to ensure that the accent color will have a threshold level of colorfulness, or that there will be sufficient contrast between the identified color in the preview image 310 and the accent color. If the identified color does not have the threshold level of colorfulness, the process may proceed to step 518, where the image processor 230 identifies a next color in the preview image 310 having the next greatest coverage. However, if the identified color is sufficiently colorful, the process may advance to block 508.

At block 508, the image processor 230 determines a complement color of the identified color. As used herein, the complement of a particular color may correspond to a color on the opposite side of the color wheel from the particular color. For example, red may be a complement to green, while blue may be a complement to orange.

At block 510, the image processor 230 identifies a color of the preview image 310 (hereinafter referred to as the "closest image color") that is closest to the determined complement color (e.g., a color of the preview image 310 closest in hue to the complement color). In some embodiments, the image processor 230 identifies the closest image color based upon the histogram for the preview image 310 indicating which colors appear in the preview image 310. In some embodiments, the closest image color may correspond to a color of the preview image 310 closest to the complement color that satisfies a colorfulness threshold.

At block 512, the image processor 230 identifies a color in a predetermined palette that is closest to the closest image color identified at block 510. In some embodiments, the image processor 230 maintains a predetermined palette comprising a plurality of different colors. The colors of the palette may be selected to correspond to a spectrum of different hues, and may comprise several gradations of each hue. In some embodiments, each of the colors of the predetermined palette may satisfy all of one or more predetermined selection criteria. For example, the palette colors be have been selected such that all colors in the predetermined palette meet a colorfulness threshold and have sufficient contrast with white text. As such, in some embodiments, it is unnecessary for the image processor 230 to perform separate determinations as to whether the identified palette color meets one or more selection criteria (e.g., colorfulness, contrast with text, etc.), because all colors in the palette already meet the one or more selection criteria.

At block 514, the image processor 230 may check the identified palette color against one or more additional selection criteria, such as whether the identified palette color meets a hue restriction (e.g., does not have a brown or orange hue). For example, the palette may comprise colors having brown or orange hues but which satisfy all other selection criteria (e.g., colorfulness, contrast with text, etc.). However, some selection methods may still exclude brown or orange hues when selecting an accent color, while other selection methods may allow for colors having brown and orange hues included in the palette to be used as accent colors. In some embodiments, other selection criteria, such as contrast with text colors other than white, may also be considered.

If the identified palette color satisfies the selection criteria, then at block 516, the image processor 230 selects the identified palette color to be used as the accent color of the content item 300. On the other hand, if the palette color does not satisfy the selection criteria, the process may return to block 518, where the image processor 230 identifies a next color in the preview image 310 having the next greatest coverage and attempting to select an accent color based upon a complement of the next color.

In some embodiments, the image processor 230, instead of using a predetermined palette, may use the determined complement color or the closest image color as the accent color, provided that the determined complement color or the closest image color satisfies one or more selection criteria (e.g., colorfulness threshold, sufficient contrast with text color, hue criteria, and/or the like). In some embodiments, the image processor 230 may identify the palette color based upon the complement color instead of the closest image color.

Algorithms and Waterfall Selection

As illustrated in FIGS. 4 and 5, in some embodiments the image processor 230 may fail to select an accent color based on a given set of selection criteria using a particular selection method (e.g., a dominant color selection method or a complementary color selection method). For example, the dominant color selection method may fail to select a suitable accent color based upon the preview image 310, if no color in the preview image 310 having at least a threshold coverage satisfies all of the selection criteria (e.g., no color having above a minimum coverage in the preview image 310 meets a colorfulness threshold, has sufficient contrast with white text, and is not orange or brown). Similarly, a complementary color selection method may also fail to select a suitable accent color if none of the colors having above a minimum coverage in the preview image 310 have complements that satisfy all selection criteria.

In some embodiments, the image processor 230 selects an accent color for the content item 300 using a color selection algorithm. Each color selection algorithm may use a waterfall selection approach comprising a plurality of color selection methods to determine an accent color for the content item 300. The color selection methods associated with each color selection algorithm may be selected in order to select an accent color meeting certain desired criteria, and may correspond to different levels of restrictiveness.

The image processor 230 may maintain different levels of selection parameters, ranging from most restrictive to least restrictive. For example, the colorfulness threshold maintained by the image processor 230 may comprise a high colorfulness threshold (most restrictive), a medium colorfulness threshold, and a low colorfulness threshold (least restrictive). In some embodiments, different coverage thresholds corresponding to different percentages of the preview image 310 may be maintained.

Under an algorithm using a waterfall selection approach, the image processor 230 maintains a plurality of different selection methods associated with different sets of selection criteria. The image processor 230 may attempt to select an accent color using a first selection method. If an accent color is not able to be selected using the first selection method, the image processor 230 then attempts to select an accent color using a subsequent selection method. In some embodiments, the plurality of selection methods are organized in an order from most restrictive to least restrictive. In other words, the image processor 230 first attempts to select an accent color using a first selection method that is most restrictive, and uses increasingly less restrictive selection methods if an accent color is not able to be selected. In some embodiments, the image processor 230 uses a subsequent selection method that is more restrictive for a first selection criteria (e.g., coverage amount) in comparison to the first selection method but is less restrictive for a second selection criteria (e.g., colorfulness threshold). The color selection methods corresponding to the algorithm may be in descending order of restrictiveness and desirability, wherein the accent color is selected using the first color selection method in the waterfall selection approach that is able to select a suitable accent color.

Figure 6:
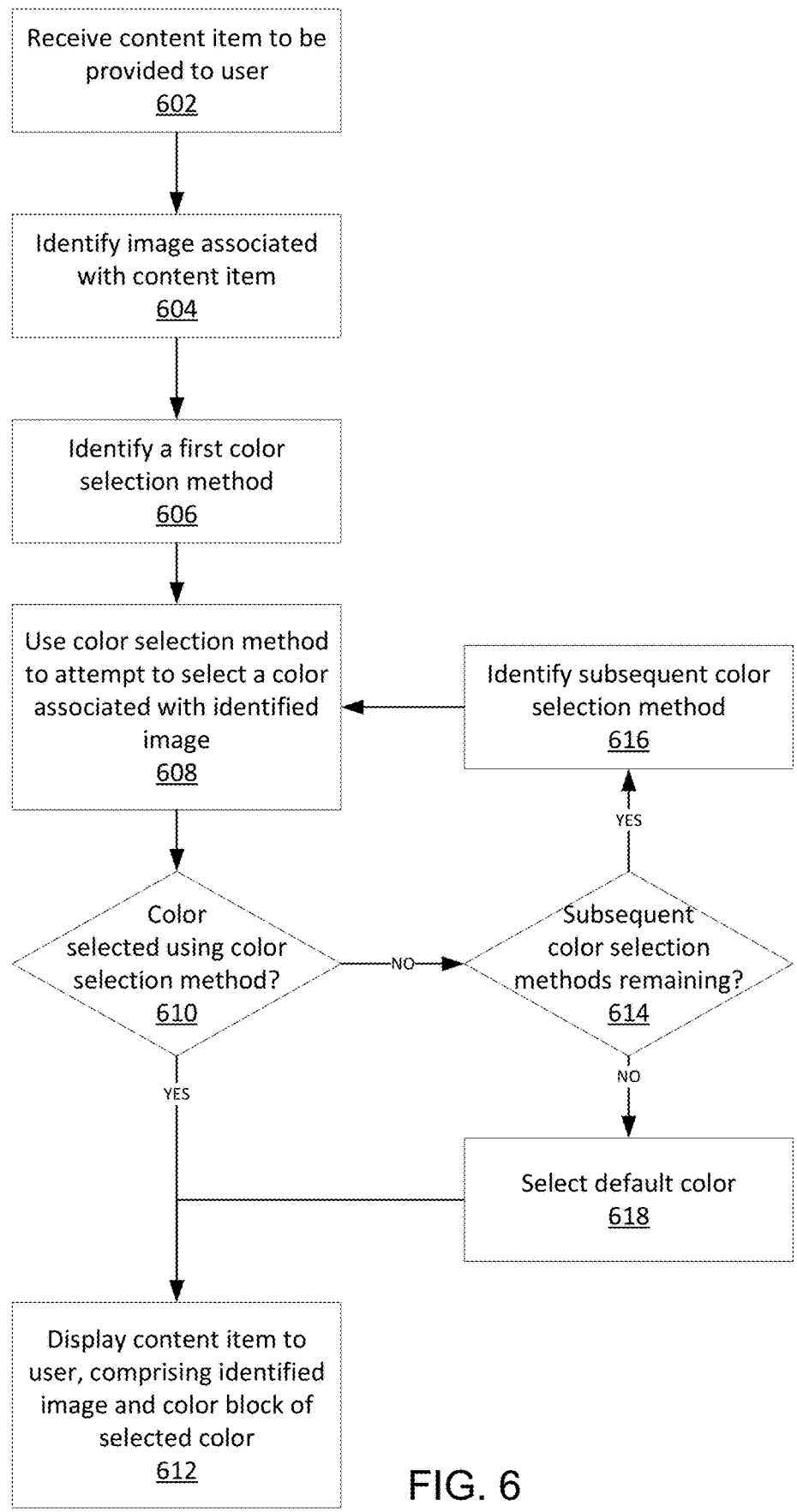
FIG. 6 illustrates a flowchart of a waterfall process for determining an accent color for a content item, in accordance with some embodiments.

FIG. 6 illustrates a flowchart of a waterfall process for determining an accent color for a content item, in accordance with some embodiments. At block 602, the image processor 230 receives the content item 300 to be provided to a user of the online system, for which an accent color is to be selected. In some embodiments, the content item 300 corresponds to a content item shared by another user of the online system. In some embodiments, the content item 300 is automatically recommended to the user based upon one or more attributes of the user (e.g., one or more affinities associated with the user). At block 604, the image processor 230 identifies the preview image 310 associated with the content item 300.

At block 606, the image processor 230 identifies a first selection method of a plurality of selection methods for selecting an accent color for the content item 300. In some embodiments, the first selection method may correspond to a most restrictive method of the plurality of selection methods. The first selection method may be a dominant color selection method or a complementary color selection method.

At block 608, the image processor 230 uses the identified selection method to attempt to select an accent color to be displayed in association with the preview image 310 of the content item 300. If an accent color is able to be selected using the identified selection method, then at block 610, the content item 300 is displayed to the user using the preview image 310 and the selected accent color (e.g., as the color block 330).

On the other hand, if an accent color is not able to be selected using the identified selection method, then the image processor 230, at block 612, determines whether there are any remaining selection methods of the plurality of selection methods. If so, then at block 614, the image processor 230 selects a subsequent selection method to attempt to select an accent color for the content item 300. If there are no more selection methods of the plurality of selection methods (e.g., the image processor 230 has attempted and failed to select an accent color using each of the plurality of selection methods), then the image processor 230 selects a default color to be used as the accent color for the content item 300. FIG. 7 illustrates a plurality of example selection methods that may be used by a particular algorithm utilizing a waterfall approach, in accordance with some embodiments. The algorithm may correspond to a "vibrant" algorithm, which desires to select an accent color for the content 300 based on (1) a preference for colorful vivid colors for less colorful colors, (2) a preference for prominent colors that represent a meaningful percentage of the preview image 310, and (3) a bias against colors having brown or orange hues. As illustrated in FIG. 7, each selection method may be either a dominant color or a complementary color selection method, and be associated with a plurality of selection criteria. The selection criteria may include colorfulness threshold, whether certain colors are allowed to be used or excluded as accent colors, such as whether brown and orange hues are allowed to be used as accent colors, and minimum coverage of the preview image 310. In addition, it is understood that the selection methods illustrated in FIG. 7 may include additional selection criteria that are not shown (e.g., selection criteria that are constant across all of the selection methods shown).

As illustrated in FIG. 7, the image processor 230, when selecting an accent color for a content item 300, may first attempt to select an accent color using a first selection method corresponding to a dominant color selection method. In some embodiments, an administrator of the online system may decide that it is more desirable in general to base accent colors on dominant colors instead of complementary colors, and so configure the waterfall accent color selection process to first attempt to select an accent color using dominant color selection methods before complementary color selection methods. The first selection method with a most restrictive set of selection criteria (e.g., a high colorfulness threshold, brown and orange not being allowed, and the selected dominant color covering at least 3% of the preview image 310).

If the image processor 230 is unable to select an accent color using the first selection method, the image processor 230 may attempt to select an accent color using a plurality of other selection methods in sequence. For example, a second selection method may comprise a dominant color selection method similar to the first selection method, but allow for colors having less coverage (0.5% instead of 3% coverage). The third selection method may relax the restriction on colorfulness threshold (from high to medium) but require larger coverage compared to the second selection method (e.g., 1.0% instead of 0.5%). The fourth selection method lowers the minimum coverage threshold back to the level of the second selection method while retaining the lower colorfulness threshold of the third selection method.

If the image processor 230 is unable to select an accent color based on any of the first four selection methods, the image processor 230 may attempt to use a complementary color selection method (e.g., the fifth selection method). In some embodiments, complementary color selection methods are not associated with a colorfulness threshold, as the potential accent colors that may be selected using the complementary color selection method are selected from a predetermined palette, where all colors of the palette already meet a colorfulness threshold. The fifth color selection method may disallow orange or brown accent colors, and may require the accent color to be selected based on a complement of a color of the preview image 310 having at least 0.5% coverage.

If the image processor 230 is unable to select an accent color using the fifth selection method, the image processor 230 may attempt to use a sixth selection method. The sixth selection method is a dominant color selection method that requires only a low colorfulness threshold, allows for brown or orange accent colors. Because the low colorfulness threshold and available of brown and orange hues as accent colors may greater expand the number of available colors that may be selected as accent colors, the sixth selection method may require a minimum coverage level greater than that of the fourth or fifth selection methods (e.g., 0.75% instead of 0.5%).

If the image processor 230 is unable to select an accent color using the sixth selection method, the image processor 230 may attempt to use a seventh selection method. The seventh selection method corresponds to a complementary color selection method where brown and orange hues are allowed, and the minimum coverage threshold has been lowered (to 0.25%). If the image processor 230 is unable to select an accent color using any of the seven selection methods, then a default color may be used as the accent color for the content item 300. For example, the preview image 310 is a grayscale image that contains no colors suitable for use as an accent color in accordance with any of the above described color selection methods. As such, a default color (e.g., a gray color) is selected for use as an accent color for the content item 300.

While FIG. 7 illustrates a particular set of selection methods that may be used for accent color selection under a particular algorithm, it is understood that in other embodiments, different algorithms having different selection methods or different numbers of selection methods may be used in a waterfall arrangement to select accent colors for content items. For example, a "muted" algorithm may comprise a plurality of color selection method configured to select an accent color blends in more with the preview image 310, avoiding accent colors that are too vibrant or "loud." For example, each color selection method of the "muted" algorithm may comprise a maximum colorfulness selection criteria, ensuring that the selected accent color does not exceed a particular colorfulness threshold. In one embodiment, the "muted" algorithm comprise a waterfall arrangement of a plurality of dominant color selection methods, each associated with a minimum and a maximum colorfulness threshold, with different coverage thresholds and different hue restrictions (e.g., a first dominant color selection method with a high coverage threshold and disallowing brown/orange hues, a second dominant color selection method with a lower coverage threshold and disallowing brown/orange hues, a third dominant color selection method with a high coverage threshold but allowing brown/orange hues, and a fourth dominant color selection method with a lower coverage threshold and allowing brown/orange hues).

In addition, while FIGS. 6 and 7 illustrate the image processor 230 as attempting different selection methods in a particular order, in some embodiments the image processor 230 may dynamically select a subsequent selection method based upon the results of a previous selection method (e.g., based upon which selection criteria of the previous selection method were unable to be satisfied). For example, if the first selection method was unable to select an accent color because none of the identified color where able to meet a colorfulness threshold, the image processor 230 may select a subsequent selection method with a lower colorfulness threshold.

Alternative Embodiments

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   receiving, at an online system, a content item to be provided to a user of the online system, the content item associated with an image;
   selecting an accent color to be displayed with the image, based upon the image, by:
      identifying a set of one or more color selection methods, each corresponding to a respective set of criteria, and wherein each color selection method is configured to select a color from a set of colors associated with the image that satisfies the respective set of criteria, or to determine that no color of the set of colors satisfies the respective set of criteria;
      executing at least one color selection method of the one or more color selection methods to select a color from the set of colors associated with the image to be used as the accent color; and
   providing the content item for display to the user of the online system, wherein the content item is displayed using the image and the selected accent color.

2. The method of claim 1, wherein executing the at least one color selection method comprises:
   executing a first color selection method of the one or more color selection methods corresponding to a first set of criteria to select a color from the set of colors to be used as the accent color; and
   in response to a determination that no color of the set of colors satisfied the first set of criteria corresponding to the first color selection method, executing a subsequent color selection method of the one or more color selection methods.

3. The method of claim 2, further comprising, in response to a determination that no color of the set of colors satisfies the respective sets of criteria corresponding to the one or more color selection methods, designating a predetermined default color as the accent color.

4. The method of claim 1, wherein the content item is displayed using the image and a visual element colored using the selected accent color.

5. The method of claim 4, wherein the visual element comprises a rectangular block of solid color displayed adjacent to an edge of the image, or a color border surrounding at least a portion of the image.

6. The method of claim 1, further comprising quantizing the colors of the image, and wherein the set of colors is based upon the quantized colors of the image.

7. The method of claim 1, wherein a color selection method of the one or more color selection methods comprises identifying a first color corresponding to a color of the image that satisfies the respective set of criteria corresponding to the color selection method having a greatest amount of coverage within the image relative to other colors in the image, or that no color of the image satisfies the respective set of criteria.

8. The method of claim 1, wherein the respective set of criteria corresponding to a color selection method of the one or more color selection methods comprises a prominence threshold indicating a minimum amount of the image represented by a selected color.

9. The method of claim 1, wherein the respective set of criteria corresponding to a color selection method of the one or more color selection methods comprises a colorfulness threshold for a selected color.

10. The method of claim 1, wherein a color selection method of the one or more color selection methods identifying a first color based upon a complement of a second color that is present in the image, based upon the respective set of criteria corresponding to the color selection method, or that no color satisfies the respective set of criteria.

11. A non-transitory computer readable storage medium storing computer program instructions, the computer program instructions when executed by a computer processor causes the processor to perform the steps of:
   receiving, at an online system, a content item to be provided to a user of the online system, the content item associated with an image;
   selecting an accent color to be displayed with the image, based upon the image, by:
      identifying a set of one or more color selection methods, each corresponding to a respective set of criteria, and wherein each color selection method is configured to select a color from a set of colors associated with the image that satisfies the respective set of criteria, or to determine that no color of the set of colors satisfies the respective set of criteria;
      executing at least one color selection method of the one or more color selection methods to select a color from the set of colors associated with the image to be used as the accent color; and
   providing the content item for display to the user of the online system, wherein the content item is displayed using the image and the selected accent color.

12. The non-transitory computer readable storage medium of claim 11, wherein the instructions further cause the processor to execute the at least one color selection method by:
   executing a first color selection method of the one or more color selection methods corresponding to a first set of criteria to select a color from the set of colors to be used as the accent color; and
   in response to a determination that no color of the set of colors satisfied the first set of criteria corresponding to the first color selection method, executing a subsequent color selection method of the one or more color selection methods.

13. The non-transitory computer readable storage medium of claim 11, wherein the content item is displayed using the image and a visual element colored using the selected accent color.

14. The non-transitory computer readable storage medium of claim 11, wherein the instructions further cause the processor to quantize the colors of the image, and wherein the set of colors is based upon the quantized colors of the image.

15. The non-transitory computer readable storage medium of claim 11, wherein a color selection method of the one or more color selection methods comprises identifying a first color corresponding to a color of the image that satisfies the respective set of criteria corresponding to the color selection method having a greatest amount of coverage within the image relative to other colors in the image, or that no color of the image satisfies the respective set of criteria.

16. The non-transitory computer readable storage medium of claim 11, wherein the respective set of criteria corresponding to a color selection method of the one or more color selection methods comprises a prominence threshold indicating a minimum amount of the image represented by a selected color.

17. The non-transitory computer readable storage medium of claim 11, wherein the respective set of criteria corresponding to a color selection method of the one or more color selection methods comprises a colorfulness threshold for a selected color.

18. The non-transitory computer readable storage medium of claim 11, wherein a color selection method of the one or more color selection methods identifying a first color based upon a complement of a second color that is present in the image, based upon the respective set of criteria corresponding to the color selection method, or that no color satisfies the respective set of criteria.

19. An online system, comprising:
a receiver configured to receive a content item to be provided to a user of the online system, the content item associated with an image;
at least one processor configured to:
select an accent color to be displayed with the image, based upon the image, by:
identifying a set of one or more color selection methods, each corresponding to a respective set of criteria, and wherein each color selection method is configured to select a color from a set of colors associated with the image that satisfies the respective set of criteria, or to determine that no color of the set of colors satisfies the respective set of criteria;
executing at least one color selection method of the one or more color selection methods to select a color from the set of colors associated with the image to be used as the accent color; and
provide the content item for display to the user of the online system, wherein the content item is displayed using the image and the selected accent color.

20. The online system of claim 19, wherein the at least one processor configured to execute the at least one color selection method by:
executing a first color selection method of the one or more color selection methods corresponding to a first set of criteria to select a color from the set of colors to be used as the accent color; and
in response to a determination that no color of the set of colors satisfied the first set of criteria corresponding to the first color selection method, executing a subsequent color selection method of the one or more color selection methods.

* * * * *